United States Patent [19]
Kniff

[11] 3,758,135
[45] Sept. 11, 1973

[54] AUTOMOBILE TOW BAR
[76] Inventor: August A. Kniff, 137 S. Eucla, San Dimas, Calif. 19773
[22] Filed: June 21, 1972
[21] Appl. No.: 264,766

[52] U.S. Cl................ 280/402, 214/86 A, 280/503
[51] Int. Cl............................ B60p 3/06, B60d 1/14
[58] Field of Search................... 280/402, 292, 495, 280/496; 214/86 A; 294/82 AH

[56] References Cited
UNITED STATES PATENTS

| | | | |
|---|---|---|---|
| 3,501,169 | 3/1970 | Nutt | 280/491 R |
| 3,170,715 | 2/1965 | Johnson | 280/402 R |
| 1,864,781 | 6/1932 | Wells | 280/402 R |
| 1,860,518 | 5/1932 | Wells | 280/402 R |
| 1,690,372 | 11/1928 | Livesay | 214/86 AR |

Primary Examiner—Leo Friaglia
Assistant Examiner—Randall Schrecengost
Attorney—D. Gordon Angus et al.

[57] ABSTRACT

An automobile tow bar for rear-engine vehicles which comprises a central member having an offset area that permits slipping the tow bar under a front axle area into a clip fixed to the center of the frame of an automobile. A cross member is fixed to the longitudinal central member, and the cross member has clevis members which can nest the torsion bar and axle assemblies of the front vehicle suspension to carry the weight of the front of the vehicle off the ground. The forward end of the central longitudinal shaft of the tow bar is equipped with linkage for attachment to a towing vehicle. Lifting the tow bar, to engage the tow vehicle's hitch, raises the front wheels of the towed vehicle from the ground and supports the weight of the towed vehicle on its torsion rod axle assembly, thus relieving other more critical parts from excessive strain.

11 Claims, 6 Drawing Figures

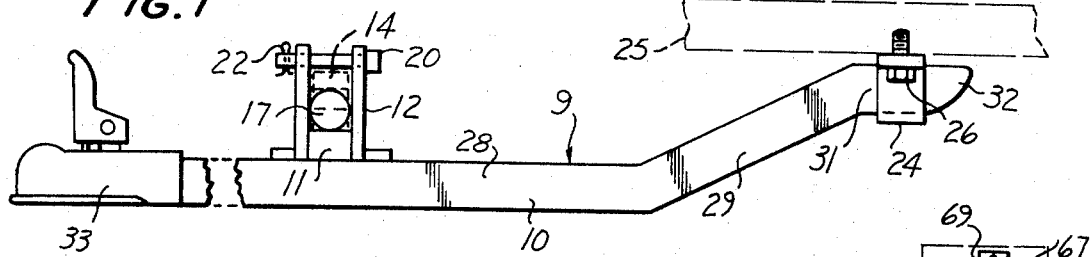
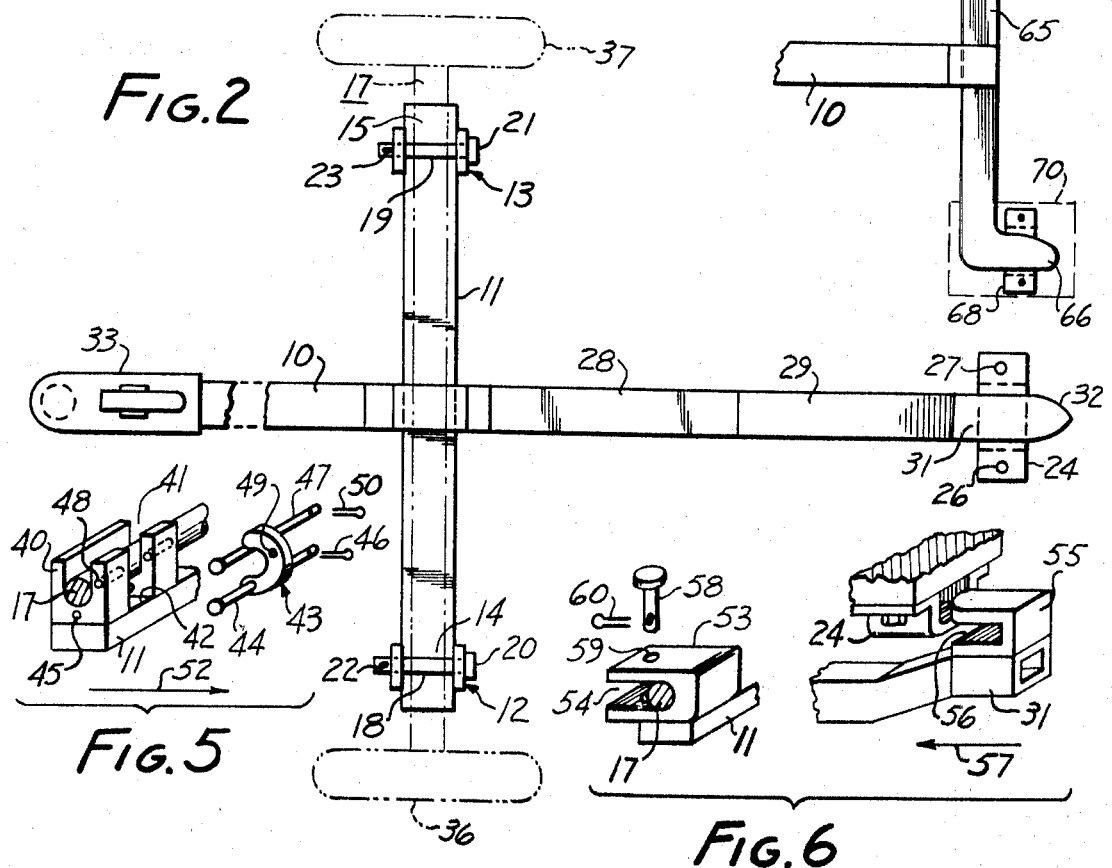
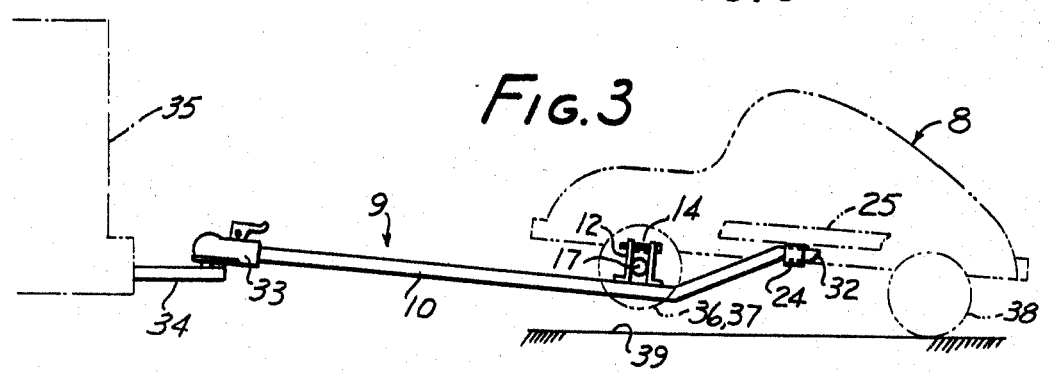

AUTOMOBILE TOW BAR

This invention relates to a tow bar assembly for rear-engine automotive vehicles such as the Volkswagen.

An object of this invention is to provide a tow bar for automotive vehicles that is quickly detachable after use and quickly and easily fixed for towing, and which is very safe. It closely couples the towed vehicle to the vehicle which tows it, and because there are only two wheels on the ground, the towed vehicle closely tracks the towing vehicle.

A further object of this invention is to provide an automotive tow bar that will elevate the front suspension linkage of the towed vehicle to raise the front tires from contact with the ground, which in other known towing systems is not done, to the great damage to the front tires. A further object of the invention is to relieve strain or stress on front wheel alignment when towing a vehicle, because they are out of contact with the ground.

A further object of the invention is to provide a tow bar that may be used for pushing the vehicle in reverse, for maneuvering, without damage to the vehicle, and under very close control.

Still another object of the invention is to provide a tow bar assembly for rear-engine automotive vehicles, that permits towing the vehicle in a forward direction without the use of threaded bolts and nuts which may loosen under the vibration caused by towing, and which could lead to vehicle loss or damage. Yet another object of the invention is to provide a tow bar assembly that is quickly mountable to a vehicle, but is self-centering and supports critical suspension members for safe towing.

Still another object of this invention is to bypass the bumper of the towed vehicle. By so doing, the risk of dangerous failure of the towing system which could result if the bumper were loose or worked loose, is completely avoided.

The above and other features of this invention will be fully understood from the following detailed description and the accompanying drawings in which:

FIG. 1 is a side elevation of the preferred embodiment of the invention;

FIG. 2 is a top view of the embodiment of FIG. 1;

FIG. 3 is a side view of the embodiment of FIG. 1 shown in assembly with a towed and a towing vehicle;

FIG. 4 is a top view of a portion of another embodiment of the invention;

FIG. 5 is a fragmentary partially exploded view in perspective view of an alternate embodiment of part of the embodiment of the invention shown in FIG. 1; and FIG. 6 is a fragmentary partially exploded view in perspective of part of still another embodiment of the invention.

In FIG. 1 there is shown the presently preferred embodiment of tow bar 9 for towing a vehicle 8, the vehicle 8 being shown in phantom in FIG. 3. The tow bar comprises a central shaft 10 (sometimes called a "central shaft member"), a cross-shaft member 11 and, as can be seen in FIGS. 1 and 2, two clevis members 12 and 13. The clevis members are fixed to opposite sides of cross-shaft member 11 to form clevis-type channels 14 and 15. The clevis-type channels 14 and 15 are adapted to receive the front axle torsion bar assembly 17 (sometimes called a "front suspension assembly") of a towed vehicle. The front axle torsion bar assembly 17 is shown in FIGS. 1, 2 and 3. The clevis members 12 and 13 are adapted to receive straight pins 18 and 19 for retaining the axle torsion bar assembly 17 within the clevis-type channels 14 and 15. Straight pins 18 and 19 are provided with heads 20 and 21 and are further adapted to receive cotter pins 22 and 23. At the end of the straight pins 18 and 19, opposite the heads 20 and 21, the ends of straight pins 18 and 19 protrude from clevis members 12 and 13, and the cotter pins 22 and 23 prevent accidental removal of the straight pins 18 and 19 under the vibration of the towing operation. A channel clip 24 (sometimes called "channel clip means") is fixed to the central tunnel member 25 of the vehicle frame by two clip attach bolts 26 and 27. The central shaft 10 has a straight section 28 (sometimes called a "first straight section") and an offset bent section 29 which (sometimes called a "second offset section") is bent upward at an acute angle to provide for the difference in height of central tunnel member 25 relative to the bottom of the axle torsion bar assembly 17. The offset bent section 29 culminates in a short length of straight (offset section 31 (sometimes called a "third offset section") which is parallel to straight section 28 and is therefore parallel to central member 25. The offset section 31 may be tapered at its extremity 32 for easy insertion into clip 24. Sections 28 and 29 and sections 29 and 31 are contiguous, and these sections are coplanar in the plane of FIG. 1.

A conventional tow bar fitting 33 is attached to the forward extremity of central shaft 10 i.e., to its free end. tow bar fitting 33 (sometimes called "tow bar fitting means") is adapted to engage the tow fixture means 34 of a towing vehicle 35.

In use, the tow bar assembly will be applied in the following manner. As a preliminary step, each vehicle 8 that expects to use the tow bar assembly will be equipped with a channel clip 24 (sometimes called "channel clip means"). This channel clip 24 is attached to the central tunnel member 25 by bolts 26 and 27. When it is desired to tow the vehicle 8, the tow bar assembly's central shaft 10 is slipped under the vehicle 8, and the tapered end 32 is passed through the channel clip 24. The front end of central shaft 10 is then raised so that the clevis-type channels 14 and 15 receive and support the axle torsion bar assembly 17. The straight pins 18 and 19 are passed through the registering holes in the clevis members 12 and 13, and then cotter pins 22 and 23 are installed in the straight pins 18 and 19 to prevent the accidental removal of straight pins 18 and 19. The tow bar assembly 9 is now ready for attachment to the tow fixture means 34 which is attached to the towing vehicle 35. Raising the central shaft 10 of the tow bar assembly 9 to engage the tow mechanism 34 raises the front wheels 36 and 37 off the ground level 39 so that only rear wheels 38 rest on the ground 39. The front end of vehicle 8 is elevated in this process. By using the tow bar 9 to raise the front axle torsion bar assembly 17 of the vehicle 8, instead of attempting to raise the vehicle 8 by its frame, it is possible to raise the front wheels 36 and 37 clear of the ground by causing only a small elevation of the front end of the vehicle.

In another embodiment of the invention, FIG. 5 shows clevis member 40 which is mounted on cross-shaft member 11. This clevis member may be substituted for each of those shown in FIG. 1. The clevis channel 41 receives the axle torsion bar assembly 17. Clevis member 40 has a transverse channel 42 cut partially through one wall to admit locking lever member 43 which is arcuate in shape to partially surround and embrace axle torsion bar assembly 17 to prevent disengagement of axle torsion bar assembly 17 from the member 40. The locking lever 43 is pivotally mounted on lower pin 44, which is retained in lower swivel bore 45 by cotter pin 46. Locking pin 47 engages locking bore 48 and matching throughbore 49 in locking lever 43 to retain locking lever 43 in retaining relationship with axle torsion bar assembly 17. Locking pin 47 is held in assembly with clevis member 40 by cotter pin 50. Arrow 52 in FIG. 5 indicates the direction of towing so that the stress is not put on the locking lever 43. In use, tow bar assembly 9 would be engaged with channel clip 24 as hereinbefore described for the invention embodiment of FIG. 1, the locking lever 43 then being pushed down in transverse channel 42 to retain axle torsion bar assembly 17 in clevis member 40, the locking lever 43 pivoting about swivel pin 44. The locking pin 47 is inserted in locking bore 48 and through the bore 49 in locking lever 43 to hold the locking lever 43 in engagement with axle torsion bar 17, locking pin 47 being retained by cotter pin 50.

In FIG. 6 there is illustrated another embodiment of part of the invention, which may be used in place of the respective portion of FIG. 1. A pair of clevis members, as illustrated by clevis member 53, are fixed to crossshaft member 11 of the embodiment of FIG. 1, with clevis channel 54 facing toward the tow bar fitting 33 and parallel to the cross-shaft member 11. Instead of a tapered extremity 32, as shown in FIG. 1, the straight offset section 31 has fixed to it a third clevis member 55 having a clevis channel 56 opening toward the tow bar fitting 33. The clevis member 55 is adapted to slidably engage the channel clip 24.

In use, the embodiment of FIG. 6 enables the tow bar to be placed under the vehicle and pulled forward in the direction of arrow 57 to engage channel clip 24 and the axle torsion bar assembly 17 simultaneously. After the torsion bar assembly 17 is engaged, retainer pins 58 are inserted into locking holes 59 to retain the torsion bar assembly in the clevis member 53. Cotter pins 60 retain the pins 58 in the clevis member 53. The arrow 57 illustrates the direction of towing for the vehicle.

It is to be understood that a vehicle not having a central tunnel frame member 25 for attachment of channel clip 24 could use a similar tow bar assembly by being modified as shown in FIG. 4, with a second crossmember 65 having a pair of tongues 66 and 67 which engage a pair of channel clips 68 and 69. The tongues extend generally normally to the cross-member 65 (in plan view) and are generally parallel to the central shaft member (also in plan view). The channel clips 68 and 69 are attached to the frame 70 of the vehicle. This embodiment will be found useful for vehicles which have two parallel frame members, rather than a single conventional tunnel. This embodiment will function in the same manner as the previously-described embodiment of the invention.

The portions of the cross shaft member 11 which extend from opposite sides of the central shaft member are sometimes called "cross arms", and two of these are formed by cross shaft member 11, one on each side of central shaft member 10.

As can best be seen in FIGS. 1 and 6, second offset section 29 forms a clearance drop (i.e., a bend) whereby the central shaft member can pass beneath otherwise-interfering automobile structure which is located between the towing vehicle and the channel clip means.

The terminology "said third section has means adapted to be removably attached to an automobile frame" is used herein. This terminology relates to adaptation of the end of the central shaft member to be removably attached to the automobile frame. In FIG. 1, this comprises that part of the structure forming the third offset section 29 which is slid into channel clip means 24. In FIG. 4, it comprises tongues 66 and 67. In FIG. 6, it comprises third clevis member 55. In each case, it is a means connected to or integral with the central shaft member that is engageable to structure fixed relative to the frame of the vehicle.

The advantages and greater safety of this invention compared with prior art devices will be understood from the foregoing. By lifting the forward wheels off the ground, the damage done to tires, suspensions and front wheel alignment by conventional four-wheels-on-the-ground towing is avoided. Also, the towed vehicle is closely coupled to the towing vehicle, and cannot steer itself laterally relative to the towing vehicle, which is a common cause of towing problems. In addition, it by-passes the bumper, so the bumper is neither damaged by, nor relied on for, towing. A major portion of the weight is supported by the rear wheels when a rear-engine vehicle is being towed and therefore the driving stability of the towing vehicle is only minimally affected by the weight added to the rear end of the towing vehicle by the towed vehicle.

This invention is not to be limited to the embodiments shown in the drawings and described in the description, which are given by way of example and not of limitation, but only in accordance with the scope of the appended claims.

I claim:

1. A tow bar assembly having tow bar fitting means for coupling with a towing vehicle and adapted for attachment to the frame of an automobile and to its front suspension assembly, which comprises:
    a. a central shaft member, said central shaft member having a first straight section, a free end of said first straight section and a second offset section formed at an acute angle to said first straight section, said second offset section being contiguous and substantially coplanar with said first straight section, and a third offset section formed substantially parallel to said first section, said second section adapted to form a clearance drop between said first and third sections, said third section having means adapted to be removably attached to an automobile frame, said central shaft member having a top side and a bottom side, said top side adapted to be the side closest to said automobile;
    b. a cross-shaft member, said cross-shaft member fixed to said central shaft member transversely of the first straight section and adapted to form substantially equal cross-arms;
    c. a pair of clevis members, each of said clevis members fixed adjacent each end of said cross-shaft member, each of said clevis members having a clevis opening extending substantially parallel in direction to said cross-shaft member, said clevis members adapted to retain the front suspension assembly of said automobile;

d. retaining pin members, said retaining pin members adapted to be assembled with said clevis members to prevent removal of said clevis members from said front suspension assembly.

2. A tow bar assembly according to claim 1 wherein said tow bar fitting means is fixed to the free end of said first straight section of said central shaft member opposite said second section, said tow bar fitting adapted to engage tow fixture means on a towing vehicle.

3. A tow bar assembly according to claim 1 which includes channel clip means, said channel clip means being adapted to be fixed to the underframe of an automobile, said channel clip means being adapted to retain said third section of said central shaft member.

4. A tow bar assembly according to in claim 3 wherein said channel clip means is adapted to engage said third section of said central shaft member for slip installation and slip removal.

5. A tow bar assembly according to claim 3 which includes a third clevis member, said third clevis member fixed to said top side of said third section of said central shaft member, said third clevis member having a clevis channel facing in the direction of said free end of said first straight section, said third clevis member adapted to slidably engage said channel clip means.

6. A tow bar assembly according to claim 5 wherein each of said clevis members has a clevis channel facing parallel to said first straight section of said central shaft member.

7. A tow bar assembly according to claim 5 wherein each of said clevis members has a clevis opening facing in the direction of said free end of said first straight section of said central shaft member, said clevis channels extending substantially parallel to said central shaft member.

8. A tow bar assembly according to claim 1 wherein each of said clevis members has a transverse channel, each of said transverse channels opening through one wall of its respective clevis member; a locking lever member mounted to each clevis member; each said locking lever members being pivotally mounted to its respective member for entry through the respective transverse channel, and a locking pin member for each said locking lever member, each said locking member being adapted to engage its respective locking lever members and clevis member to lock the respective said locking lever member in engagement with said front suspension assembly.

9. A tow bar assembly according to claim 1 in which said means and the third section comprises a second cross member, said second cross member fixed to said third offset section of said central shaft member, said second cross member having a pair of tongues formed at the opposite extremities of said second cross member, said retaining tongues being adapted to be attached to the frame of said automobile.

10. Apparatus according to claim 9 which includes a pair of channel clip members, said channel clip members adapted to be attached to said frame of said automobile for retention of said offset retaining tongues of said second cross member.

11. Apparatus according to claim 10 which includes said pair of channel clip means being adapted to engage said pair of retaining tongue means of said second cross member for slip installation and slip removal.

* * * * *

UNITED STATES PATENT OFFICE
CERTIFICATE OF CORRECTION

PATENT NO. : 3,758,135
DATED : September 11, 1973
INVENTOR(S) : AUGUST A. KNIFF

It is certified that error appears in the above-identified patent and that said Letters Patent are hereby corrected as shown below:

| | |
|---|---|
| Col. 2, line 16 | cancel "which" |
| Col. 2, line 17 | after "tion") insert --which-- |
| Col. 2, line 21 | "(offset" should read --offset-- |
| Col. 2, line 29 | insert a comma after "10" |
| Col. 2, line 30 | capitalize "tow", first occurrence |
| Col. 3, line 5 | before "member" insert --clevis-- |
| Col. 4, line 32 | change "to" second occurrence to --by-- |
| Col. 5, line 15 (Cl. 4, line 1) | cancel "in" |

Signed and Sealed this thirtieth Day of March 1976

[SEAL]

Attest:

RUTH C. MASON
Attesting Officer

C. MARSHALL DANN
Commissioner of Patents and Trademarks